United States Patent [19]

Staab

[11] 4,377,000

[45] Mar. 15, 1983

[54] AUTOMATIC FAULT DETECTION AND RECOVERY SYSTEM WHICH PROVIDES STABILITY AND CONTINUITY OF OPERATION IN AN INDUSTRIAL MULTIPROCESSOR CONTROL

[75] Inventor: Carl J. Staab, Plum Boro, Pa.

[73] Assignee: Westinghouse Electric Corp., Pittsburgh, Pa.

[21] Appl. No.: 160,411

[22] Filed: Jun. 18, 1980

Related U.S. Application Data

[63] Continuation-in-part of Ser. No. 146,933, May 5, 1980, abandoned.

[51] Int. Cl.³ .............................................. G06F 11/00
[52] U.S. Cl. ..................................... 371/11; 364/184; 364/187
[58] Field of Search .................. 371/11; 364/101, 119, 364/200, 900, 184, 186, 187

[56] References Cited

U.S. PATENT DOCUMENTS

| | | | |
|---|---|---|---|
| 3,636,331 | 1/1972 | Amrahn | 364/119 |
| 3,875,390 | 4/1975 | Eccles et al. | 364/101 |
| 3,931,503 | 1/1976 | Berkebile et al. | 364/119 |
| 3,959,638 | 5/1976 | Blum et al. | 371/11 |
| 4,032,757 | 6/1977 | Eccles | 364/119 |
| 4,153,198 | 5/1979 | Eki et al. | 364/101 |
| 4,200,226 | 4/1980 | Piras | 364/119 |

*Primary Examiner*—Charles E. Atkinson
*Attorney, Agent, or Firm*—E. F. Possessky

[57] ABSTRACT

A multiprocessor computer control system for a process includes at least two central processors and respectively associated input/output systems. Control system faults are detected and a bootstrap microprocessor is triggered into its fault detector and recovery mode. The output control signals are placed on and central processors are stopped and restarted and then it is determined which if any of them is to be inoperative. A reconfigured control system is defined with the inoperative unit(s) excluded. The microprocessor switches the input/output systems as necessary to structure the control system in reconfigured form so that process control can resume without disturbance.

5 Claims, 8 Drawing Figures

AUTOMATIC FAULT DETECTION AND RECOVERY SYSTEM WHICH PROVIDES STABILITY AND CONTINUITY OF OPERATION IN AN INDUSTRIAL MULTIPROCESSOR CONTROL

CROSS-REFERENCE TO RELATED APPLICATIONS

This is a continuation-in-part of application Ser. No. 146,933, filed May 5, 1980 and now abandoned.

MICROFICHE APPENDIX

A microfiche appendix comprising five microfiche of 299 frames of software listing has been deposited in compliance with 37 C.F.R. 1.96(b).

BACKGROUND OF THE INVENTION

The present invention relates to industrial process controls and more particularly to complex, multiprocessor control systems which have redundancy capabilities to provide for continued operation of an industrial process even though a failure may occur in some portion of the control system.

Many industrial processes are so complex that the most cost effective way to design a control system for them is to base the design on the use of multiple, large, central processors (CPU's) which share the work load. One theoretical alternative is to use numerous hardwired microprocessors, but design complexity makes this approach impractical or undesirable.

The industrial user of control systems places high priority on the availability of the production equipment used for process operations because process availability is a direct measure of productivity. It is desirable that multiprocessor control systems be structured to provide for stopping production when the status of the process or its control system becomes unsafe or otherwise undesirable. However, to provide best process availability, the multiprocessor control system should be structured to avoid unnecessary process trips. Specifically, a control system fault should not cause a process trip if the fault can be circumvented.

One past practice in the control art has been to provide manual operator override in the event of a failure in the automatic control. Another practice has been to provide a redundant backup automatic control system which is bumplessly switched into operation as the active control if a fault occurs on line in the designated primary automatic control. Process continuity and availability are thereby maintained.

Generally, these approaches have been acceptable for single CPU systems, but they are inadequate for multi-CPU shared-core systems. For example, in a typical four-CPU system, even the simplest restart, without system reconfiguration, typically requires the operator to sequence twelve push buttons. The provision of a duplicate multi-CPU system to serve as a backup is not a viable alternative due to the size and cost of usual multiprocessor systems. The use of a backup also does not take advantage of the inherent redundance which exists in a multiprocessor system.

In past data processing system practices, computer faults have been handled by stopping the computer and automatically restarting the computer through its bootstrapping operation to resume its duty if the shutdown was due to a program alarm as opposed to a deactivating hardware failure. However, no on-line control activity has to be maintained during computer system fault recoveries in the data processing art.

The known prior art activity thus provides no direction for automatically achieving high process safety and availability where an industrial process control system is structured with multiple central processors and where a discrete backup system does not exist because of prohibitive costs.

It is desirable that a multiprocessor computer control system have a high level of reliability, be easily maintained, be fault tolerant, and in the event of a failure, be quickly recoverable. Generally, system reliability can be incorporated into system hardware and software from the early design stages by the application of good design practices which limit fault propagation by the use of redundant logic for critical subsystems, and by the application of available error checks to trap faults before they can induce a system failure.

The design of the overall multiprocessor control system configuration should also generally take into account any single point of failure and provide the necessary backup equipment to sustain operation when such a failure occurs. Reliability and maintenance may also be enhanced by the use of modular construction which provides definable interfaces and simplifies the development of individual modules.

While system maintenance time is reduced by good mechanical design and construction, a significantly larger percentage of the cost of maintenance is expended diagnosing a failure rather than repairing it. Thus, as a result of the high level of complexity involved in large industrial production systems, it is desirable to have a multiprocessor control system diagnose its own failures and identify the equipment or module which has failed in some way.

SUMMARY OF THE INVENTION

A multiprocess control system in accordance with the present invention automatically analyzes system failures and provides for safe and reliable automatic recovery and compensation for a failure. Since the principal function of the multiprocessor control system is to monitor and control a process, there is no single point of control failure which stops the control and monitor activity.

Typically, input/output (I/O) subsystems for the processors are not exact duplicates, but can have sufficient redundancy such that the loss of one system can be tolerated for short periods of time while operating at reduced capacity.

When a control failure occurs, the compensation which the system takes or the recovery technique implemented is appropriate for the failure and the process operation. All failures can be recorded and annunciated either when they occur or immediately after the system recovers from the fault. For some types of failures annunciation may be sufficient, i.e. printer out of paper. In other cases, substitute alternate equipment is automatically switched to replace the failed equipment. In some instances, a failure triggers a complete automatic system reconfiguration.

DESCRIPTION OF THE PREFERRED EMBODIMENT

Figure 1:
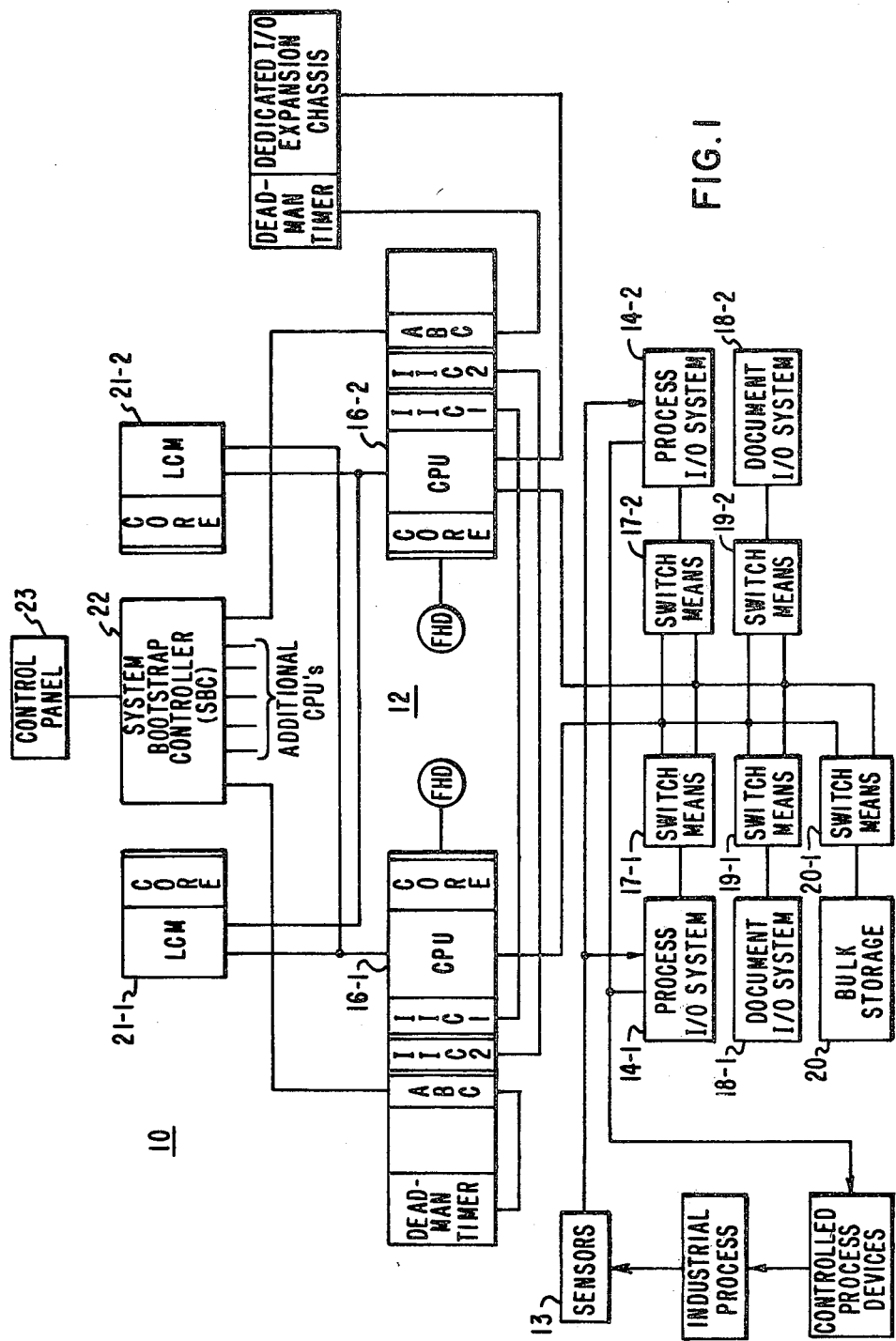
FIG. 1 shows a block diagram of an industrial process which is operated by a multiprocessor control system arranged in accordance with the principles of the invention.

More particularly, there is shown in FIG. 1 an industrial production system 10 such as a steel strip rolling mill or an electric power plant. A multiprocessor control system 12 is provided for monitoring parameters of the system 10 and for operating various controlled devices such as motors, pumps, fans, valves, etc. in generating production from the system 10.

Individual sensors 13 for temperature, pressure, flow, speed, position, electrical quantities and other parameters are coupled to the processors through conventional digital and analog input/output (I/O) systems 14. Output control signals are coupled from the processors to the production system 10 through the I/O systems 14.

In this case, two processors 16-1 and 16-2 (CPUs) are included in the multiprocessor control system 12 for sharing the monitor and control load. These processors can, for example, be W2500 units supplied by Westinghouse Electric Corporation. Process I/O systems 14-1 and 14-2 are respectively provided for the CPUs 16-1 and 16-2. Similarly, respective document I/O systems 18-1 and 18-2 are provided for the CPUs 16-1 and 16-2. A single bulk storage unit 20 is shared by both CPUs 16-1 and 16-2.

Each CPU has a large core memory (LCM) unit 21-1, 21-2. Suitable respective switch means 17-1, 17-2, 19-1 and 19-2 are provided for selectively coupling the process and document I/O systems to one CPU or the other CPU.

In the general case, three or more CPUs may be integrated into a control system with each CPU having its designated process I/O system and document I/O system. As shown in FIG. 1, the particular control system being described has the capability of employing up to seven CPUs. It is known as the PROTEUS system which is commercially supplied by the assignee hereof.

A system bootstrap controller (SBC) 22 is coupled to the CPUs to provide for automatic fault detection and system reconfiguration such that no single failure point interrupts the process control. A control panel 23 permits the operator to apply external control over the SBC 22.

Figure 3:
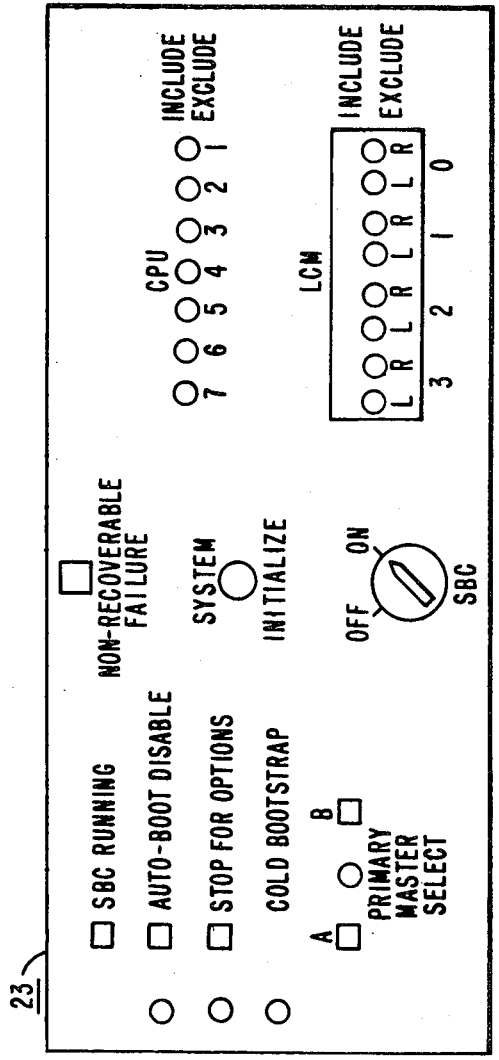
FIG. 3 shows an operator panel used as a part of the fault detection and recovery system.

As shown on the control panel 23 depicted in FIG. 3, various operator options are available such as options which include or exclude each CPU and each LCM. The following logic functions are also provided by suitable panel input circuitry in conjunction with SBC logic programming:

2—Large Core Memory Chassis (LCM)
2—Fixed Head Discs (FHD)
2—Interprocessor Interrupt Subsystems (IIC)
2—Document I/O Subsystems
2—Process I/O Subsystems
1—Bulk Storage Subsystem (e.g., Mag. Tape)
4—Core Modules The equipment is arranged into the basic system configuration shown in FIG. 1. The principal function of the control system is to monitor and control a process. The hardware is configured so that no single point of control system failure prevents the monitor and control activity. A failure in the bulk storage subsystem would preclude some functions which would be an inconvenience but which are not normally essential to performance of the system's primary functions.

The SBC 22 is installed as shown in FIG. 1, and uses the control panel 23 shown in FIG. 3. The panel 23 provides the following external controls:

1. System Initialize—A protected push button that causes the bootstrap sequence to be initiated.
2. Option Stop Select—A switch that indicates to the SBC 22 that the bootstrap should stop for its various options rather than use normal default values.
3. Master Select Switch—A switch that indicates which of the two possible bootstrap "Master" CPUs is to be used first.
4. Cold Bootstrap—A switch that causes all available CPUs to be started including those which the software has chosen to exclude.
5. Auto-Boot Disable—A switch that disables the automatic bootstrap of the system.
6. SBC Disconnect—A keyswitch that disconnects the SBC 22 from the system and allows manual bootstrapping of the system.

In accordance with the invention, the fault detection and recovery system employs the SBC 22 in detecting a system failure, identifying the failure and restarting the system with a reconfigured control if necessary.

The fault detection and recovery operation occurs with little or no process disturbance since outputs from the control system 12 continue to operate the process as the self-analysis and control system restructuring occurs.

The SBC 22 monitors the control system for stoppage and in the event of a stoppage, automatically sequences the control system through its bootstrap procedure, taking advantage of the extent to which the system has been designed with fault tolerance. Each time the system is bootstrapped, it is reconfigured to use all the available hardware.

Generally, the SBC 22 performs the following:

1. Reset, bootstrap, and start all CPUs individually.
2. Exclusion of failed CPUs from the system.
3. Exclusion of failed LCMs from the system.
4. Automatic selection of the bootstrap master.
5. Automatic system start-up on power-up.
6. Deadman timer initiated bootstrap.
7. Operator initiated system bootstrap.

Preferably, the SBC 22 comprises a system bootstrap controller, which may be an Intel 8080 microprocessor-based logic sequencer, and an auxiliary bootstrap interface card (ABC) for each CPU in the system so as to provide an interface for the SBC 22 to each CPU.

The SBC interface to the ABC for each CPU in the system includes the following:

1. Bootstrap Control Data—This includes two 16-bit words which are comprised of data from the various control panel switches and the status of deadman timers. This information is bussed to the ABC card in each processor 16-1 or 16-2.
2. CPU Output Register—This 8-bit register is loaded by the selected master CPU and is used to mask CPUs which the system software has determined should not be used by the system. The eighth bit in this byte is used to initiate a bootstrap sequence if required by the software.

TYPICAL CONTROL SYSTEM FAULTS FOR WHICH FAULT DETECTION AND RECOVERY PROTECTION ARE PROVIDED

The following describe anticipated system faults and the means by which the faults are detected and system recovery is triggered:

| Peripheral Failure | |
| --- | --- |
| Card readers | CRT display processors |
| Card punches | Line printers |
| Tape readers | Magnetic tapes |
| Tape punches | Modems |

When a device handler detects an invalid device status which indicates a peripheral failure, it attempts to clear the fault through a software reset command and retry the I/O operation. On failure to complete successfully the operation after a predetermined number of retries, the handler bids an applications program. This program notifies the system operator of the device failure and may also substitute an alternate device for the failed one. This function is moved to the applications level to provide the flexibility required to deal with various system configurations.

| Process I/O Failure | |
| --- | --- |
| A to D Converter | Digital inputs |
| Point cards | Digital outputs |
| Master crate | Analog outputs |
| Remote crate | |

When a process I/O handler detects a fault in a portion of the I/O equipment, it attempts to clear the fault through a software reset command and retry the I/O operation. On failure to achieve a successful completion of the operation after a predetermined number of retries, the handler attempts to substitute any available backup hardware. If in retrying the operation on the backup equipment a successful completion is obtained, the handler bids an applications program to notify the system operator of the primary equipment failure and continue operation on the backup. If a successful completion is not obtained, the handler bids an applications program. This program notifies the system operator of the loss; and the applications program elects to continue operation in a reduced state, reconfigure the system, or trip to manual control.

| I/O Subsystem Failure | |
| --- | --- |
| I/O chassis | ICD/IBD cards |
| I/O bust expansion (IXE)/extender (IXR) cards | Z-panel |
| Deadman timer test (ITT) card | Intermediate controllers |

When the ITT card handler detects the failure of an I/O bus, by the ITT card not responding correctly, it bids an applications program. This program notifies the system operator of the bus failure. It then elects to allow the system to continue to operate in a degraded state, reconfigure the system, or trip to manual control.

| Fixed Head Disc Failure | |
| --- | --- |
| Disc controller | Disc drive |

When the dual disc handler detects an invalid status word from a disc, it bids an applications program which notifies the system operator of the loss. The handler disconnects the failed disc from the system and continues operation on the remaining disc. The failover is accomplished without loss due to the discs having been written with redundant images.

| CPU I/O Bus Failure | |
| --- | --- |
| CPU I/O slots | CPU I/O drives |
| Intermediate controllers | |
| ITT card | |

When the ITT card handler detects the failure of a CPU I/O bus, it treats the failure as a basic CPU fault and handles it in the same manner as a failure in the CPU confidence check.

| CPU Confidence Check Failure | |
| --- | --- |
| Basic CPU operation | Floating point |
| Instruction set | |

During the idle loop in the duty cycle calculation task, each CPU executes a confidence check routine which tests the CPU integrity. If a failure is detected in this routine, the system reconfigures itself without the suspect CPU. After reconfiguration the system notifies the system operator of the loss.

| Time-Out Error (I/O Bus, DMA Request, Interrupt, etc.) | |
| --- | --- |
| CPU Bus | Device Controllers |
| I/O Bus | |

If these interrupts are the result of a device controller failure, they also show up as peripheral failures. The occurrence of these errors are annunciated so that reconfiguration may be done if the number of interrupts is excessive.

CPU Power Failure

The occurrence of a CPU power failure appears the same as a CPU stoppage. The CPU also fails its confidence check on restart and will not be included in the system reconfiguration.

LCM Power Failure

The LCM power fail interrupt indicates that an LCM chassis has lost power. However, it does not identify which LCM chassis was powered down. Not knowing which chassis failed precludes the use of this interrupt as a valid fault indicator. The majority of LCM power failures are the direct result of service personnel repairing a chassis which is not being used by the system. If the system attempts to access core in a powered down chassis, a core parity error is generated and handled appropriately.

Instruction Violation

When an instruction violation interrupt occurs, the system assumes it is the result of the execution of data.

The address of the violation is saved for output after system recovery. This is treated in the same manner as a non-recoverable software error.

Recoverable Software Errors

When a recoverable software error is detected, the operator is notified of the error condition and the software which detected the error recovers from it.

Non-Recoverable Software Errors

When a non-recoverable software is detected, the system saves the current task running, the condition of various system flags and other pertinent information about the error. The system then bootstraps and the saved information is output.

Software Hang

When the software becomes hung in an infinite loop, it causes the ITT card associated with the hung CPU to drop out and the system is bootstrapped and restarted.

| Memory Parity Error | |
|---|---|
| Extended addressing unit (EAU) | LCM |
| Core | |

In a virtual memory system, it is imperative to determine the real memory address of a parity error. Any questionable core pages must be promptly eliminated from system use before they cause other problems. The method of determining the address of a parity error varies with the cause of the memory access. In the case of DMA devices the CPU is interrupted on the device channel with a status bit from the device controller indicating a parity error. The handler for the device determines the location of the error for that device and transfers to a common parity error routine with the real address of the error. If the parity error is the result of executing a program instruction or the out-of-sequence execution of a buffered I/O request, a processor interrupt is generated and the real address is saved in two temporary registers. The parity error interrupt macro reads these registers and transfers to the common parity error routine. The parity error routine is entered with the real address in two parts, the virtual address and the map setting. If the virtual address indicates that the parity error took place in dedicated core, the CPU must be tagged as unreliable and the system reconfigured excluding it just as if it had failed its confidence check. If the virtual address was in shared core, the routine checks that the map setting is correct for the running system. If it was found to be an invalid setting, the EAU is suspect, as well as the software, and the CPU is eliminated from the system configuration. If the map setting is a valid page, then the page is assumed to be bad and is not used in reconfiguring the system. In all cases, the real address and user are annunciated after the system is reconfigured.

Interprocessor Interrupt Card (IIC)

IIC cards

IIC bus

The IIC handler in each CPU tests the status of the IIC subsystem each time it is used; if an incorrect status is obtained, the handler bids an applications program to annunciate the loss and switch over automatically to the backup system. In addition to this status checking, each CPU periodically interrupts itself on each subsystem. This basic check confirms the availability of both systems and helps to isolate failures. If a single CPU indicates a failure, it is probably a failed IIC card. However, if several CPUs on the same bus exhibit the failure, it is likely to be a bus on the IIC arbiter card that has failed.

Whenever a system is reconfigured around a failure, great care must be taken to avoid partial recoveries. Since most reconfigurations are the result of a serious failure or software error, it is easy for random damage to be done to other parts of the system before the error can be detected. Rather than risk continued operation with an unreliable system which could result in plant damage, it is necessary to restore the system to a known state. For this reason the system bootstraps itself every time it is reconfigured. As it is being bootstrapped, the system determines what hardware is available to it and configures itself accordingly.

The system configuration is based upon a failure matrix in a system start-up module and a hardware status table which is maintained in the system's communication block (SCB). The failure matrix defines the alternate to be used when each CPU fails. This matrix also allows for the discontinuation of selected funtions in the event of certain CPU failures. The hardware status table is used to maintain a record of the various hardware which is available for use in system configuration. Hardware may be removed from system usage either for service by flagging it in this table manually or as a result of its failure. This table is also used to generate the system configuration status report which is printed after each system bootstrap. In order to accomplish the reconfiguration bootstrap, the following is performed:

A. Bootstrapping all CPUs simultaneously
B. Providing a 1K word Prom
C. Providing external switch setable data registers
D. Providing external switch selectable CPU exclusion
E. Auto-bootstrap on timeout
F. Auto-selection of master
G. Software setable CPU exclusion registers
H. Software initiated restart

OPERATION OF THE FAULT DETECTION AND RECOVERY SYSTEMS

Figure 2:
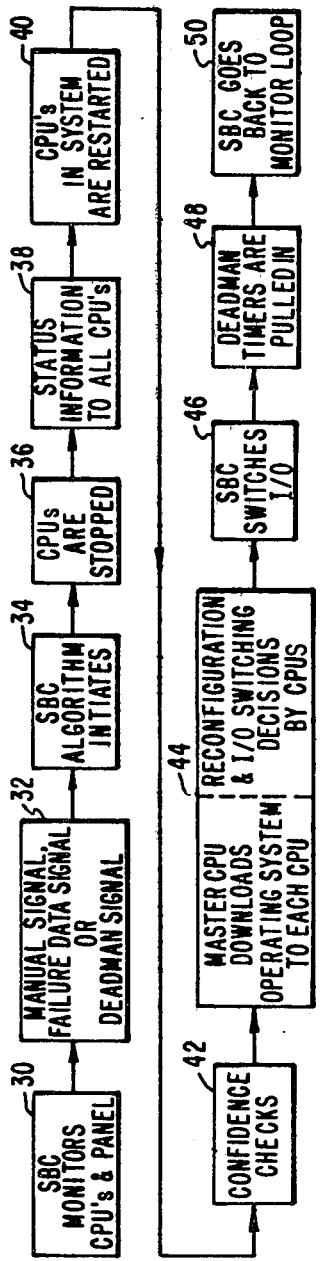
FIG. 2 illustrates a broad flow chart broadly showing the sequential operation of an automatic fault detection and recovery system in responding to a system fault and reconfiguring the control system accordingly.
Figure 4:
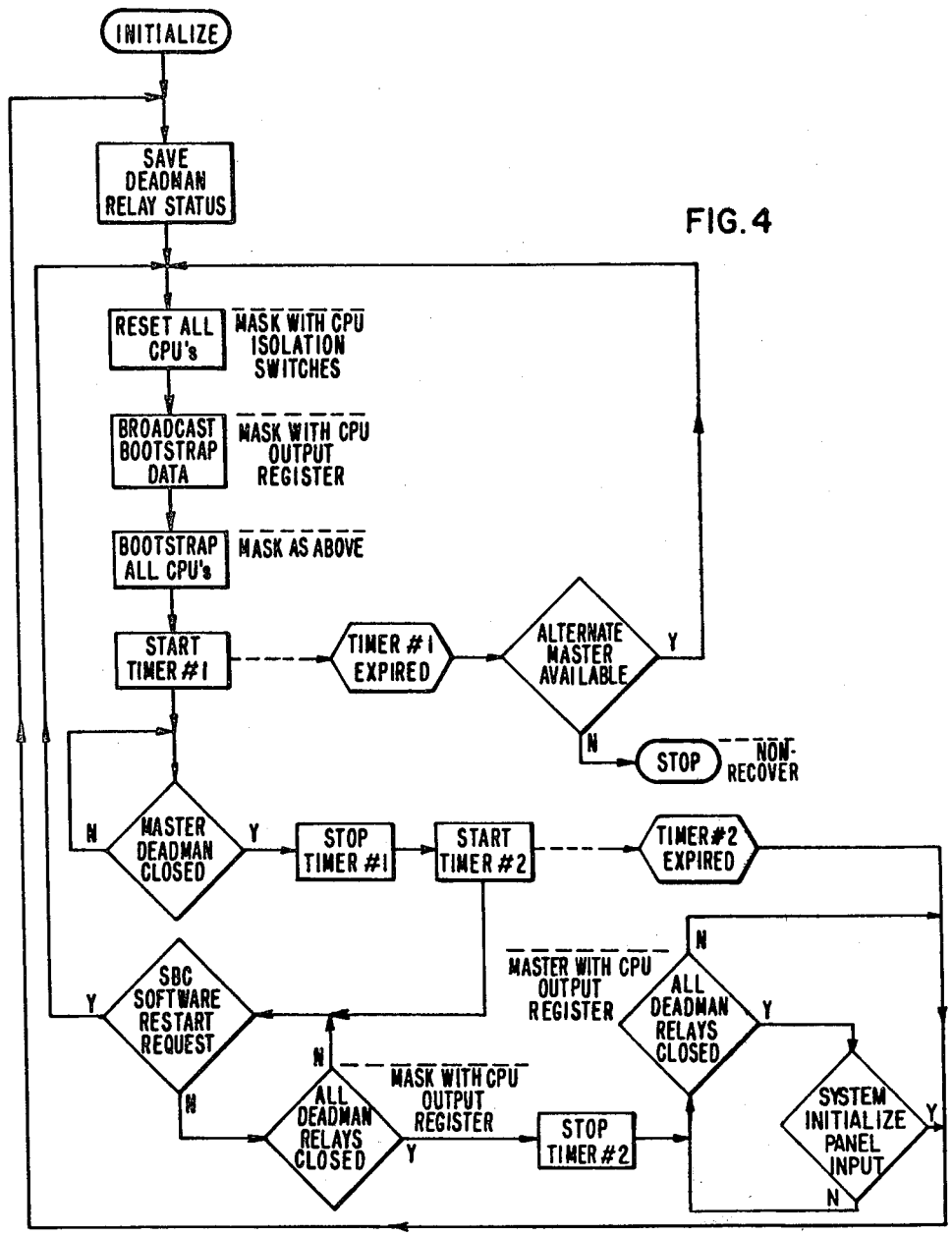
FIGS. 4-8 respectively show flow charts for programs employed in the fault detection and recovery system including a bootstrap sequence, bootstrap ROM, a PROM CPU checker program, a sector zero program and a system start-up program.

As shown generally in FIG. 2, the SBC 22 monitors the CPU's 16-1 and 16-2 and the panel as indicated by block 30. If a manual bootstrap signal, a data failure signal from one of the CPU's 16-1 or 16-2, or a deadman signal from the conventional deadman relay card provided with the CPU 16-1 or 16-2 is generated (block 32), the SBC 22 executes a recovery algorithm (block 34). The SBC detection and recovery algorithm is shown in FIG. 4 and described in greater detail below.

The CPU's are then stopped (block 36) and output control signals to the process are held stable to avoid a process disturbance. Status information on the CPU deadman relays and the settings on the panel 23 at the time of failure is broadcast to the CPUs (block 38). Each CPU which was in the system at the time of failure is restarted (block 40), at which time each CPU executes its bootstrap procedure (block 41) and its internal firmware confidence check (block 42). Thereafter each CPU signals to the SBC 22 that it is alive or failed.

Generally, the CPU with fixed head disc is designated as the master CPU, which downloads operating systems to each CPU and initiates the operating system after computer restarts are initiated by the SBC 22

(block 44). After the individual CPU confidence checks, the status of each is sent to the SBC 22 and other CPUs. If a CPU is unavailable for service, the remaining CPU(s) logically determine a reconfigured control system from the aforementioned failure matrix without the failed CPU, and appropriate decisions are made for the switching actions required to transfer the I/O from the failed CPU to the designated alternate CPU (block 44). In the illustrative embodiment being described, only one alternate CPU exists, but in the general case more CPUs could be provided and the designation of CPUs for backup I/O service is made appropriately in the failure matrix.

The transfer of I/O systems to an alternate CPU can, as preferred here, be on the basis of switching the whole I/O system. In the alternative, segregable I/O portions could be switched to multiple alternate CPUs designated for the respective portions of the I/O system from the failed CPU.

Once the CPUs make the reconfiguration decision, if any, and I/O switching decisions are made, the SBC 22 next executes the I/O switching and the contact system is reconfigured with the available CPUs and with all process and document I/O systems serviced by the active CPUs (block 46). The CPU deadman timers are then pulled in (block 48) and the SBC 22 returns to is monitor mode.

SBC Detection and Recovery

The operating sequence of the SBC 22 is essentially the same regardless of the cause of a system restart (i.e., either manual intervention, software restart IOA, or ITT response failure). The sequence is shown in FIG. 4. An example of programs comprising the sequence is listed in the microfiche appendix at pages A-73 through A-258.

When the sequence is initiated, all of the CPUs included in the system are reset; those which are included and not masked out by the CPU output register, are hardware bootstrapped. Hardware bootstrapping loads a 64-word W2500 bootstrap ROM into each machine's dedicated core. An embodiment of this bootstrap program is listed in the microfiche appendix at pages A-263 through A-265.

The CPUs are then started and the SBC 22 initiates its first time-out timer. The SBC waits for the deadman relay to be closed in the selected master CPU.

If the timer expires, the SBC 22 assumes the master to be inoperable and selects the alternate master and retries the bootstrap. Assuming that the timer did not expire, the second timer is started and the SBC 22 waits for the deadman relays to close in all the CPU's which were started.

If the second timer expires, the sequence is restarted with the same master CPU to allow the failed CPU to be excluded. If the timer did not expire, the SBC 22 then monitors the status of the system initialize button on the panel 23 and the closed deadman relays and restarts the system if the button is depressed or a relay opens.

The SBC 22 has the following external controls:
1. System initialize—actuation of this control causes the system to be bootstrapped.
2. CPU isolation switches—this group of seven switches allows CPUs to be disconnected from the system.
3. LCM bank isolation switches—this group of eight switches allows the isolation of LCM core, in blocks which correspond to one-half chassis, from the system.
4. Option stop—this switch allows the selection of stopping for various bootstrap options or the automatic use of default options.
5. Master select—this switch allows the specification of which CPU is to be used as the primary master.
6. Reset CPU register—this switch clears the software setable CPU register for manual override so that CPU may be restored to service after they have failed.
7. Auto-bootstrap disable—this switch disables the auto-bootstrap on failure sequence.
8. Auto start-up after system power up.

It also has the following W2500 software controls and data registers.
1. CPU mask register—this 7-bit register is set via an IOA instruction. It contains one bit per CPU and is used to mask those CPUs which are to be started and monitored.
2. ITT Register—this 7-bit register contains the status of the ITT cards at the time the system was bootstrapped. If the bootstrap results from an ITT dropout, the ITT which dropped is indicated.
3. LCM bank register—these eight bits of data correspond to the LCM bank isolation switches.
4. Option stop—this bit of data corresponds to the Option stop switch.
5. Master ID—this bit of data corresponds to the currently selected master.
6. IOA Restart—the execution of this instruction causes the SBC 22 to restart the system.

Figure 5:
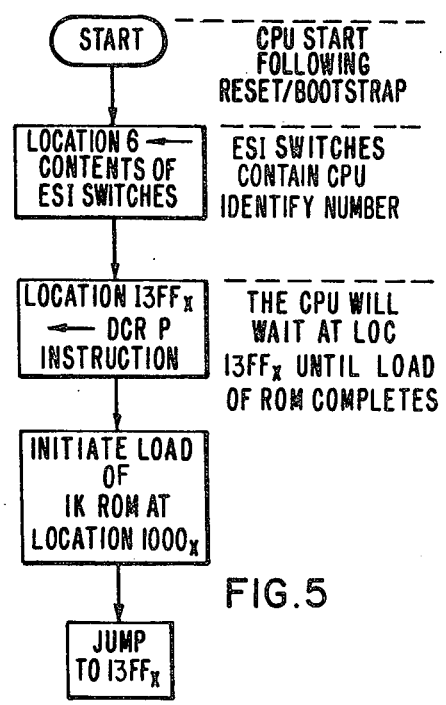

The 64-word W2500 hardware bootstrap ROM is based upon an LCM bootstrap ROM, an example of which is listed in the microfiche appendix at pages A-358 through A-371. The code which is normally used to set the default map registers is replaced with the IOA instruction required to load a 1K word ROM program from the ABC card into the W2500 processor core and transfer to it. A modified portion of the standard ROM is shown in FIG. 5.

Figure 6:
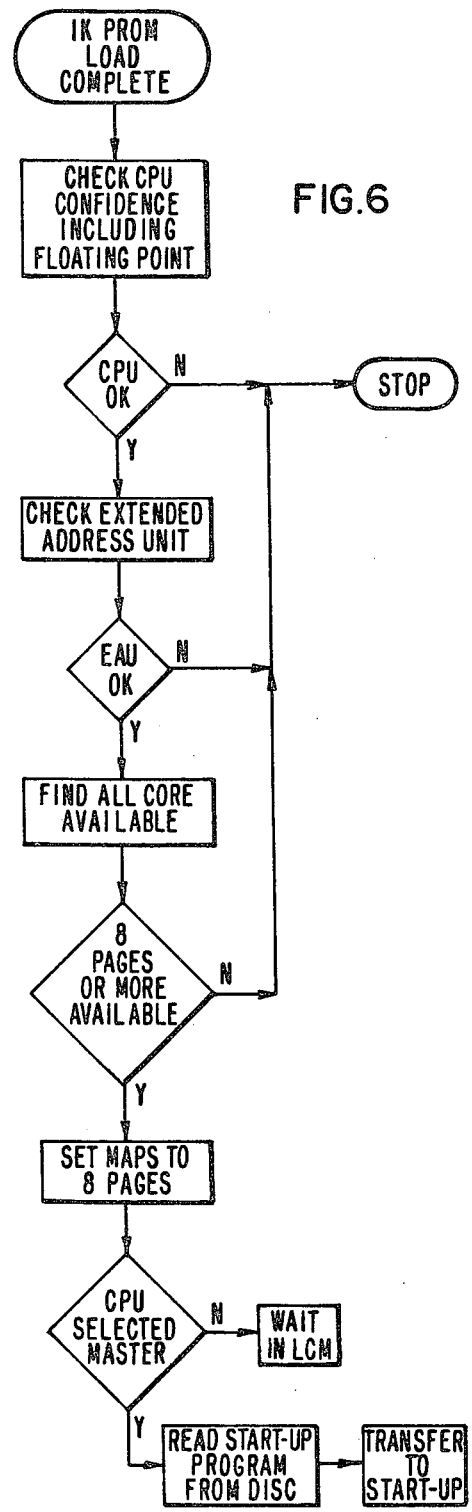

The 1K word W2500 ROM, which is loaded into core by the 64-word bootstrap program, is contained on the ABC card in each CPU. This program, depicted in FIG. 6, begins by verifying the CPU instruction set and addressing modes for correct operation. It then checks the Extended Addressing Unit (EAU) by cycling all 256 possible combinations through each of the eight registers on all 128 addressing planes, verifying each for correct contents. If an error is detected during this confidence checking routine, the CPU stops to cause it to be excluded from the system.

The eight bits of LCM isolation data are used to mask out the areas of LCM which the system is not to use; the remaining area is searched for all available core which can be correctly accessed. This information is used to construct a core accessibility table which indicates all the core that this CPU can address.

More particularly, the 1K word ROM is loaded into the core of each active CPU starting at location $1000_x$. The 64-word ROM leaves the (P) register sitting at location $13FF_x$, executing a DCR P instruction. When the last word of the 1K ROM is loaded into this location, it causes a jump to the program start. The 1K ROM bootstrap program begins by checking the basic CPU operation, including the proper execution of all instructions, designator jumps, addressing modes and floating point hardware. It also cycles a data pattern into each map register on all planes and reads them back to verify the EAU operation. If any failure is detected, the CPU is stopped.

The 8-bit LCM isolation register is input and used to mask out the core which is not to be used. The bootstrap program locates all the core which it can correctly address and access at least one location per 4K page. This information is used to build a core accessability map which is used to determine what core is available to the entire system. If a CPU cannot access at least eight pages, it is stopped.

A CPU 7 map plane in each CPU is set to the first eight core pages which are available. The bootstrap program then checks to see if the CPU is one of the two possible master CPUs. If the CPU is not a master, the program transfers to a location in LCM, where it awaits completion of the system bootstrap.

If the CPU is a master, it checks the master selected flag to determine which CPU is being used as the master. The CPU which is not selected then functions as if it was not a master. The CPU which is selected as the master reads the next segment of the bootstrap program into core (low 32K) from the fixed head disc and transfers to the program. An example of the portion of the 1K bootstrap ROM program described above is listed in the microfiche appendix at pages A-266 through A-287.

Figure 7:
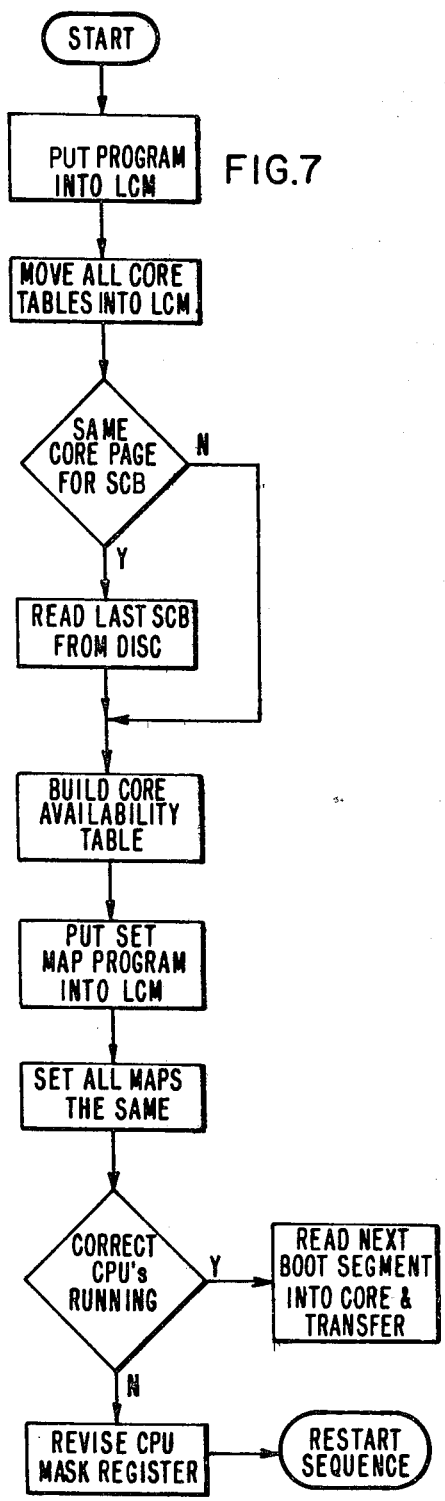

The first disc-resident segment of the bootstrap is shown in FIG. 7. This program is loaded and executed in the master CPU dedicated core. It uses the LCM to communicate with the other CPUs in the system, and does this by putting a program into LCM and causing the waiting CPUs to execute the program. The first function this program provides is to have each CPU move its core table into LCM. It then determines if the SCB is in the same core page, via checking the contents of LCMINDEX.

Based upon the individual CPU core tables and the table in the system's communication block, a system core table is constructed. This table identifies all of the core which can be accessed by the entire system. The program then sets the maps in all CPUs to the same initial values. It then determines if the correct CPUs are running, by their agreement with the CPU register settings.

If a CPU which is expected to be running is not running, the CPU register is updated and an IOA Restart issued. If the expected CPUs are running, the second disc resident portion of the bootstrap is loaded into core. The second segment sets up the system loader program and then loads the core image in each CPU. Z:FAILED, Z:CUP, and Z:CPU, and Z:ALT locations are modified in each CPU to correspond to the duties of each CPU. An example of the portion of the bootstrap program depicted in FIG. 7 is listed in the microfiche appendix at pages A-288 through A-309.

Figure 8:
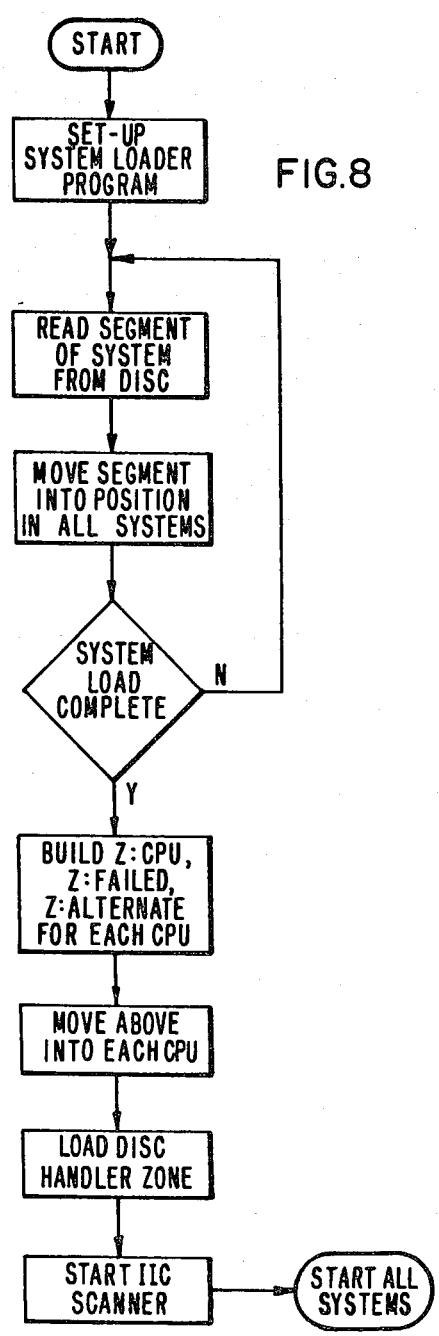

The disc handler zone is then loaded from disc and the IIC card scanners are started. The program then starts the system in all CPUs. This segment of the bootstrap is shown in FIG. 8. During this program the master CPU ITT card has to be exercised. An example of the portion of the bootstrap program depicted in FIG. 8 is listed in the microfiche appendix at pages A-309 through A-357.

Immediately after system startup, the highest priority task which is to be run is the system bootstrap task, an example of which is listed in the microfiche appendix at pages A-358 through A-371. This task runs in all CPUs, but shuts itself off in all but the master CPU.

The first function which the system bootstrap task performs is the selection of I/O for each CPU. This is done by software which selects the subsystems which each CPU requires in the configuration which resulted from bootstrapping.

The system bootstrap task determines the status of the various subsystems from the information in the system's communication block. The bootstrapping task may require modification from system to system due to variations in the hardware supplied with successively produced systems.

The system bootstrap task is also responsible for updating the information on disc to reflect the current SCB contents. The bootstrap program bids an applications program which prints out the system configuration summary after the bootstrap is complete.

The implementation of the automatic recovery procedure is done in a fashion which does not reduce overall system reliability. In view of the fact that the SBC 22 communicates with all of the CPUs in the system, it is conceivable that its failure could result in a system failure. One approach to minimize this possibility is to construct the SBC out of triple redundant voting logic with dual power supplies. However, it is preferred that a programmable microprocessor be employed for the SBC 22, and a simple means of disconnecting it from the system is provided in case of its failure. In particular, the SBC 22 consists of standard Q-line hardware, programmed in the Westinghouse Electric Corporation Microcomputer Applications Programming Language (WEMAP-80). The configuration consists of the following cards in a standard Q-line CAMAC compatible card cage:

1—Microcomputer Card (QMC)
Control Panel Interface
2—Digital Input Cards (QBI)
1—Digital Output Card (QBO)
W2500 Interface (per CPU in system)
1—Digital Input Card (QBI)
1—Digital Output Card (QBO)

In addition to the SBC, a W2500 ABC card, which contains the 1K bootstrap ROM and the SBC-to-W2500 interface, is employed as previously noted.

Appendix pages are included on microfiche and detailed information which is presented to provide a fuller understanding of an implementation of the invention.

What is claimed is:

1. A multiprocessor computer control system comprising at least a first central processor and a second central processor, a plurality of sensors coupled to equipment in a production system, means for connecting said sensors to first and second process input/output systems, a plurality of controllable devices for operating the production system equipment, switch means including at least first switch means for coupling said first process input/output system to said first central processor and second switch means for coupling said second process input/output system to said second central processor, and means for detecting control system faults and providing control system recovery in reconfigured form as necessary with substantially no process disturbance, said fault detecting and recovery means including a system bootstrap microprocessor controller coupled to each said central processor, means forming a part of said microprocessor controller and said central processors for sensing any of a plurality of control system failures and for thereby triggering said microprocessor controller into a recovery mode of operation, means for stopping said central processors and placing process control signals in a hold state upon command by said microprocessor controller, means for detecting the integrity of each central processor, said central processors including means for defining reconfigured central processor hardware so that process control duties are loaded only on operational central processor hardware, means including said microprocessor controller for operating said switch means as required so that only operational central processor hardware is coupled to the process equipment, means for restarting said system after completion of control system reconfiguration if any, and means for returning said microprocessor controller to a monitor mode after completion of the fault detection and recovery mode.

2. A system as set forth in claim 1 wherein each of said central processors has associated therewith an input/output system which is switched on a unit basis when reconfiguration is required.

3. A system as set forth in claim 1 wherein said microprocessor controller includes means for registering and executing any input/output switching action determined to be required by the central processors.

4. A system as set forth in claim 1 wherein said system fault detecting means includes means forming a part of said microprocessor controller for responding to a manual demand signal for fault detection operation and for thereby triggering said recovery mode of operation.

5. A system as set forth in claim 1 wherein said microprocessor controller includes sequencing means for stepping the whole system through its fault detector and recovery mode of operation once such mode is triggered, said microprocessor controller coupled to said central processors and said input/output switching means to provide for execution of various steps in the fault detection and recovery sequence.

* * * * *